Oct. 15, 1940.   A. C. LINDGREN   2,217,871
DUMP CART
Filed March 19, 1938   2 Sheets-Sheet 1

Inventor
Alexus C. Lindgren
By V. F. Larsague
Att'y.

Oct. 15, 1940.   A. C. LINDGREN   2,217,871
DUMP CART
Filed March 19, 1939   2 Sheets-Sheet 2
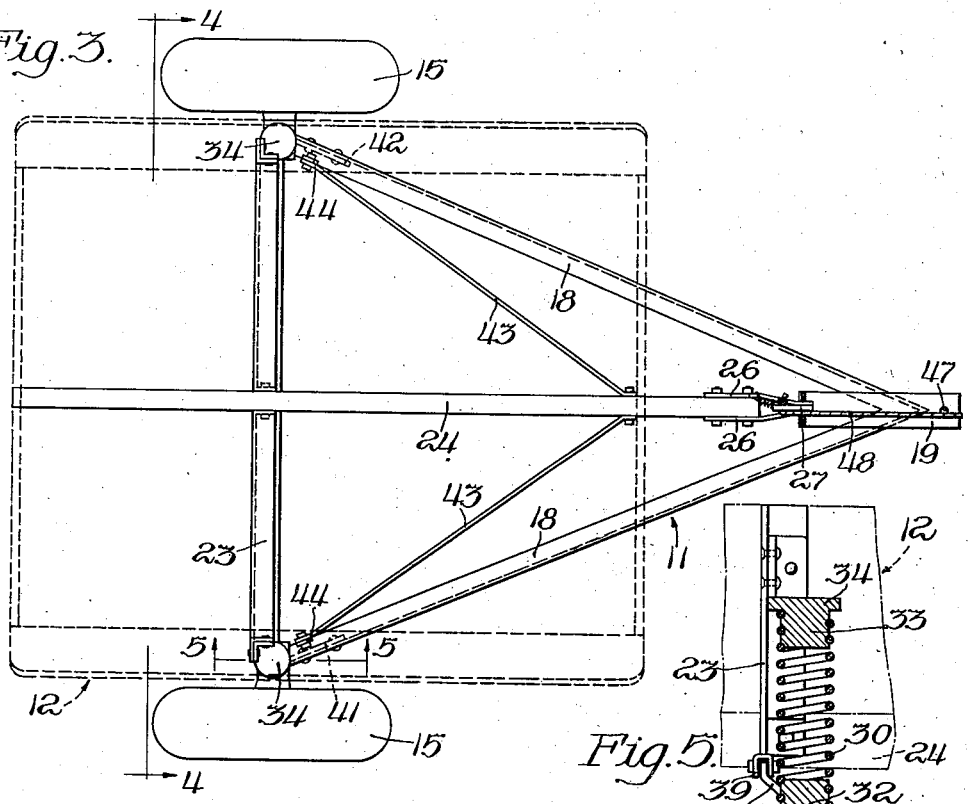
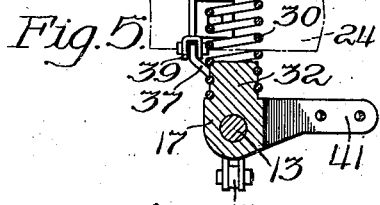
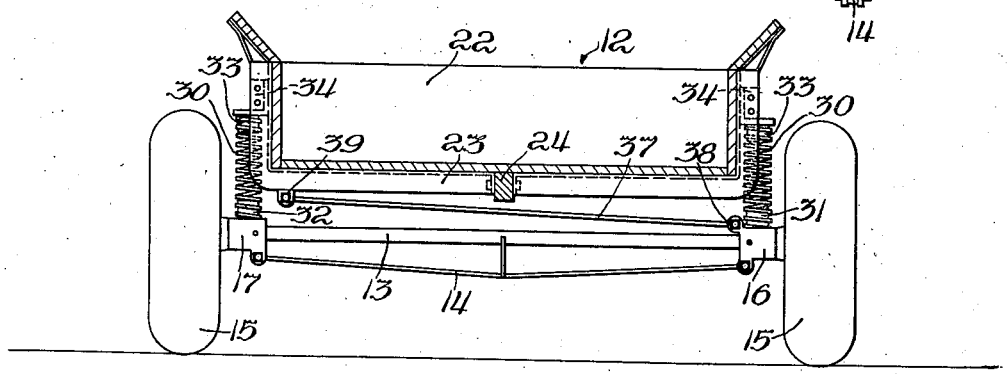
Inventor
Alexus C. Lindgren
By
Atty.

Patented Oct. 15, 1940

2,217,871

UNITED STATES PATENT OFFICE 2,217,871

DUMP CART

Alexus C. Lindgren, Chicago, Ill., assignor to International Harvester Company, a corporation of New Jersey Application March 19, 1938, Serial No. 196,954

7 Claims. (Cl. 298—5)

This invention relates to dump trucks. More specifically, it relates to a trailer type dump cart with spring suspension.

Dump carts normally consist of a two-wheel frame with a dump body pivotally mounted thereon. In some constructions there is a spring suspension of the dump body, and, in such a case, the construction, which would include both the pivotal mounting of the dump body and the frame and the spring suspension, is quite complicated.

An object of this invention is to provide a dump cart of simplified construction.

A further object is the provision of an improved dump cart having a dump body with spring suspension.

More specifically, the object of the invention is to provide a dump cart or truck in which the dump body is supported on springs extending from the frame, which springs also form the pivoting means of the dump body.

According to the present invention, a frame supported on a pair of wheels is provided. Coil springs are rigidly secured to the frame adjacent the wheels and extend upwardly supporting a dump body, which is rigidly secured to the upper ends of the springs. The forward end of the dump body is supported on the frame and is releasable therefrom by means of a latch. When the forward end of the dump body is released from the frame and the dump body moved from this position to a dumping position, the dump body pivots on the frame about the supporting coil springs.

In the drawings—

Figure 3 is a plan view of the supporting frame with the dump cart shown in dotted lines;

Figure 4 is a sectional elevation taken along the line 4—4 of Figure 3; and,

Figure 1:
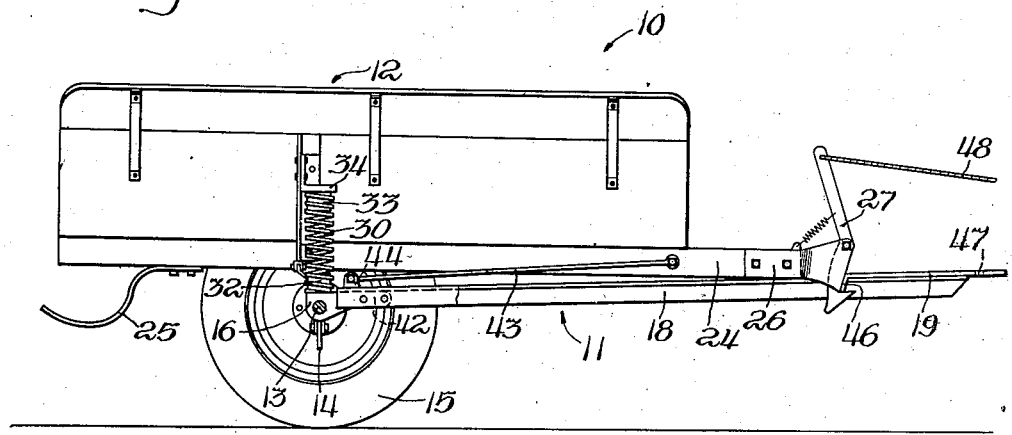
Figure 1 shows the dump cart or truck in side elevation with one wheel removed and the dump body in transport position.

Figure 5 is a detail in section along the line 5—5 of Figure 3, showing the manner in which the coil springs are attached to the frame and the dump body.

The dump truck or cart 10 is composed of a supporting frame 11 and a dump body 12. The supporting frame comprises an axle 13 strengthened by a truss rod 14, wheels 15 at the opposite ends of the axle, sleeves 16 and 17 fixed at the ends of the axle adjacent the wheels, angle members 18 extending from connection to the sleeves 16 and 17 forwardly to a common point, and a hitch plate 19 fastened to the angle members 18 at the point where they meet. The dump body comprises a body proper 22 formed of any suitable material, a transverse bolster 23 extending around the body proper, a reach pole 24 secured to the under side of the body proper and extending longitudinally of the same, a bumper 25 attached to the rear end of the reach pole, bracket members 26 at the forward end of the reach pole, and a spring controlled latch member 27 pivotally mounted in the bracket members 26.

The dump body is supported on the frame by means of coil springs 30, which are positioned on opposite sides of the dump body adjacent the wheels 15. As shown in Figures 4 and 5, the sleeves 16 and 17 have upwardly extending, threaded projections 31 and 32, to which the lower ends of the springs are rigidly attached in threaded engagement. The upper ends of the springs are rigidly attached to threaded projections 33 of brackets 34 fixed to the bolster 23 on opposite sides of the dump body. A transverse stabilizer rod 37 extends from connection with the frame through a projection 38 on the sleeve 16 to connection with the dump body through a projection 39 on the under side of the bolster 23, and prevents transverse swaying of the dump body with respect to the frame.

The attachment of the angle members 18 to the sleeves 16 and 17 is through lugs 41 and 42 on the sleeves 16 and 17. Longitudinal stabilizing rods 43 extend from lugs 44 on the angle members 18 adjacent their points of connection to the sleeves 16 and 17 forwardly to connection with the reach pole 24 adjacent the front end of the dump body, and serve to prevent longitudinal swaying of the dump body.

Figure 1 shows the dump truck or cart in transport position with the latch member 27 engaging a lip 46 at the rear end of the hitch plate 19. The dump cart is adapted to be pulled by any suitable vehicle (not shown), such as an automobile, tractor, wagon, or truck, with a connection from the vehicle extending through an opening 47 in the hitch plate 19.

Figure 2:
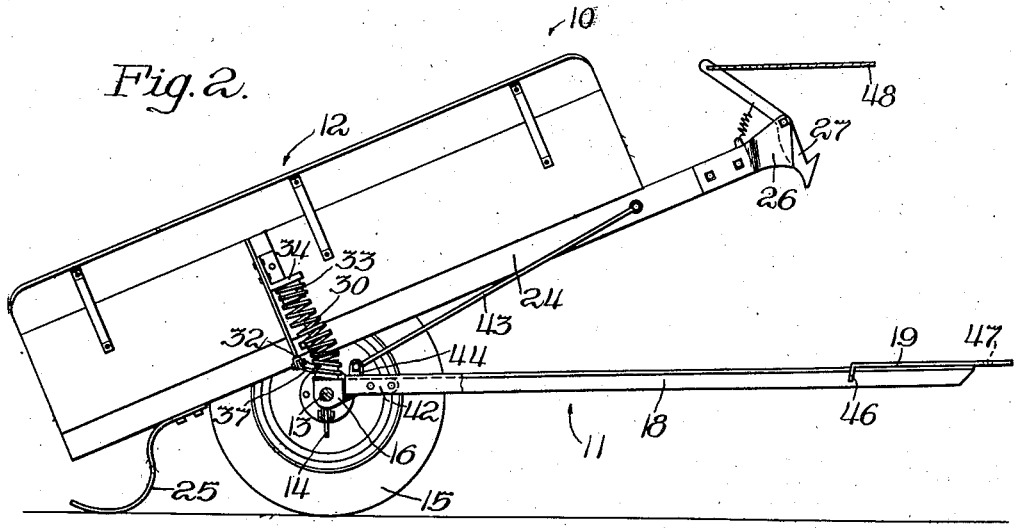
Figure 2 is a similar view, showing the dump body in dumping position.

Figure 2 shows the dump body in dumping position. In order to put the dump body in this position, the operator of the vehicle releases the latch member 27 by means of a rope 48, and the dump body moves to the position shown. In this change of position, pivoting of the dump body about the frame is effected through the springs 30, which bend with the change of position, as is to be seen from comparison of Figures 1 and 2. It is to be noted that the springs perform a dual function: that of providing the dump body with a resilient support on the frame, and that of forming the means about which the dump body pivots. By this arrangement, separate structures for pivoting and spring suspension are made unnecessary.

It is intended to limit the invention only to the terms of the appended claims.

What is claimed as new is:

1. A dump cart comprising a frame, wheels supporting the frame, coil springs rigidly secured to the frame adjacent the wheels, a dump body supported at its mid-section on the springs and being rigidly secured thereto and having a reach pole extending the length of the under side of the dump body with a bumper member secured at one end of the reach pole and a latch member at the other end releasably engaging the frame, a pair of stabilizing members connected at one end to the frame adjacent the springs and at the other end to the reach pole at points substantially removed from the line between the springs, and a third stabilizing member connected to the frame adjacent one spring and to the dump body adjacent the other spring, shifting of the dump body from transport position to dumping position effecting a bending of the coil springs about their points of securement to the frame.

2. A dump cart comprising a frame, a pair of coil springs secured at one end to the frame at spaced points so as to prevent pivoting movement of said end of the springs with respect to the frame, a dump body secured to the opposite end of the springs so as to prevent pivoting movement of said end of the springs with respect to the body, a pair of stabilizing links attached at one end to the frame adjacent the points of securement of the springs and at the other end to the dump body at adjacent points offset substantially from the line between the springs, and a third stabilizing link connected at one end to the frame adjacent the point of securement of one spring and at the other end to the dump body adjacent the point of securement of the other spring, tilting of the dump body from the transport position to dumping position being permitted by a bending of the springs.

3. A dump cart comprising a frame, a pair of coil springs rigidly secured at one end to the frame at spaced points so as to prevent pivoting movement of said end of the springs with respect to the frame, a dump body supported on and rigidly secured to the other end of the springs so as to prevent pivoting movement of said end of the springs with respect to the body, the weight of the dump body acting along a line parallel to the axis of the springs, a first stabilizing means for preventing swaying of the dump body with respect to the frame in a direction at right angles to the line between the springs, and a second stabilizing means preventing swaying between the dump body and frame along the line between the springs, tilting of the dump body from transport position to dumping position being permitted by a bending of the springs and a movement of the upper end thereof from a position over the lower end to a position substantially to one side.

4. A dump cart comprising a frame, a pair of axially extensible coil springs secured to the frame at spaced points, and a dump body secured to and carried by the springs and tending to compress them, shifting of the dump body from transport position to dumping position being permitted by a bending of the springs.

5. A dump cart comprising a frame, a pair of cylindrical coil springs having their lower end resting on and rigidly secured to the frame at spaced points, and a tiltable dump body secured to and carried by the upper end of the springs, shifting of the dump body from transport position to dumping position being permitted by a shifting of the upper end from a position over the lower end to a position substantially to one side of the springs.

6. A dump cart comprising a frame, a pair of coil springs rigidly secured at one end to the frame at spaced points so as to prevent pivoting movement of said end of the springs with respect to the frame, a dump body supported on and rigidly secured to the other end of the springs so as to prevent pivoting movement of said end of the springs with respect to the body, the weight of the dump body acting along a line parallel to the axis of the springs, and means for preventing swaying of the dump body with respect to the frame in a direction at right angles to the line between the springs, tilting of the dump body from transport position to dumping position being permitted by a bending of the springs and a movement of the upper end thereof from a position over the lower end to a position substantially to one side.

7. A dump cart comprising a frame, a dump body, an axially extensible coil spring secured to the frame and to the dump body and supporting the latter, shifting of the dump body from transport position to dumping position being permitted by a bending of the spring.

ALEXUS C. LINDGREN.